United States Patent
Masuda et al.

(10) Patent No.: US 7,293,268 B2
(45) Date of Patent: Nov. 6, 2007

(54) INSTALLATION METHOD, ACTIVATION METHOD, EXECUTION APPARATUS AND MEDIUM OF APPLICATION PROGRAM

(75) Inventors: Takahiro Masuda, Kawasaki (JP); Yoshifusa Togawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 380 days.

(21) Appl. No.: 09/764,352

(22) Filed: Jan. 19, 2001

(65) Prior Publication Data

US 2001/0052121 A1  Dec. 13, 2001

(30) Foreign Application Priority Data

Apr. 17, 2000  (JP) .............. 2000-115239

(51) Int. Cl.
 G06F 9/445 (2006.01)
 G06F 9/44 (2006.01)
(52) U.S. Cl. .................. 717/174; 717/168
(58) Field of Classification Search .......... 717/11, 717/147, 170, 173–175, 169, 178; 709/218, 709/200, 217; 707/511; 395/601, 700; 713/2
See application file for complete search history.

(56) References Cited

U.S. PATENT DOCUMENTS

| | | | | |
|---|---|---|---|---|
| 5,276,881 A | * | 1/1994 | Chan et al. ............... | 717/147 |
| 5,943,678 A | * | 8/1999 | Hocker et al. ............ | 715/511 |
| 6,035,423 A | * | 3/2000 | Hodges et al. ............ | 714/38 |
| 6,199,204 B1 | * | 3/2001 | Donohue .................. | 717/178 |
| 6,256,668 B1 | * | 7/2001 | Slivka et al. ............. | 709/220 |
| 6,282,712 B1 | * | 8/2001 | Davis et al. .............. | 717/170 |
| 6,434,744 B1 | * | 8/2002 | Chamberlain et al. ..... | 717/168 |
| 6,735,766 B1 | * | 5/2004 | Chamberlain et al. ..... | 717/173 |
| 6,862,615 B1 | * | 3/2005 | Ehrlich et al. ........... | 709/221 |
| 2002/0124055 A1 | * | 9/2002 | Reisman | |
| 2002/0135614 A1 | * | 9/2002 | Bennett .................... | 345/745 |

FOREIGN PATENT DOCUMENTS

| | | |
|---|---|---|
| JP | 06-230844 | 8/1994 |
| JP | 7-129407 | 5/1995 |
| JP | 9-244996 | 9/1997 |
| JP | 9-293007 | 11/1997 |
| JP | 10-049354 | 2/1998 |
| JP | 10-340187 | 12/1998 |

OTHER PUBLICATIONS

Notice of Reason for Rejection (mailed Oct. 24, 2006) issued in the corresponding Japanese Patent Application No. 2001-107647.
Nikkei Business Publications, Inc., "To know the difference of the file types by "an extension"", Lesson 7 for making use of a computer by learning from the fundamental operation [Edition for Smooth Operation of Windows], Oct. 30, 1999, pp. 218-223 (CSDB: Domestic Technical Journal 200100224035).

* cited by examiner

Primary Examiner—Wei Zhen
Assistant Examiner—Chih-Ching Chow
(74) Attorney, Agent, or Firm—Staas & Halsey LLP

(57) ABSTRACT

Without letting a user execute a cumbersome judgment of a version, an application program of the most suitable version is installed for data file automatically, thus an automatic activation of the application becomes possible. Firstly, a document file of a readout target is analyzed, a feature point as reserved word of macro instruction is extracted, and a version of an application suited for the document file is distinguished by an extracted feature point. Secondly, it is judged whether an application program of the version distinguished mentioned above is installed already. When found not being installed based on this judgment result, an application program of the version is newly installed.

11 Claims, 14 Drawing Sheets

INSTALLATION METHOD, ACTIVATION METHOD, EXECUTION APPARATUS AND MEDIUM OF APPLICATION PROGRAM

BACKGROUND OF THE INVENTION

1. Field of the Invention

The present invention relates to the technology of automatic installation and automatic activation of an application of a version necessary for data.

2. Description of the Related Art

Data form of a document file made with a personal computer and a word processor, and data form of a spreadsheet file is changed according to version up of an application program which is used to make/update the data. Therefore, there are many cases that data made with a program of a new version cannot be used by a program of an old version. On the contrary, there is the case that the data which was made with an application of an old version cannot be edited by an application of a new version.

In case of application of a word processor, data storing form is different due to a version of an application. As a result, there is the case that layout of a document cannot be reproduced with an application program of another version. Therefore it is necessary to convert data form using another application called a document converter. In addition, the usable object is different due to its version in case of spreadsheet program. Therefore, there are cases in which errors occur when reading data with a different version of a one program.

Furthermore, the facility program that a constant procedure called macro is described is attached in this kind of program. This macro-specification, presence of reserved word, for example, is different due to a version of the program. Therefore, macro concerned may have produced execution impossibility or an error when opening data file with a program of a version different from the version with which the data was made.

In networked society represented with Internet, there are many cases in which this kind of data file is exchanged via communication. Thus, it was a big problem whether an application program installed in one's computer could be applicable for the version of the received data.

Therefore, a procedure was necessary in case that treating the data file with a version of the application installed in the user's computer was impossible. The user, judges a version of the application that can be used, investigates an acquisition point of the application, and installs it on one's computer, after the user obtained an application.

In case a data file is given a different extension due to a version, the applicable version of the application program can be known by just referring to extension.

However, like a document form of "doc", there are cases when the universal extension is applied even if versions of the application program with which the document was made are different. In this case the judgment of an appropriate version was difficult in just observing data file from the outside.

Therefore, in the worst case scenario, repeating the following procedure was necessary. A user should try to install an application program of various kinds of versions with cut and try and repeats opening the data file.

The present invention has been made to solve the above-explained problems, and therefore, has an object to provide such a technique capable of automatically installing an application program of a version optimally selected for a data file, thus eliminating a cumbersome version judging operation by a user, and automatically installing application program with the optimum version.

SUMMARY OF THE INVENTION

Firstly, this invention analyzes the data file which is to be read, and extracts a characteristic point or a feature point. A version of an application suited for the data file is distinguished by such an extracted characteristic point or feature point. Secondly, it is determined whether an application program of the version distinguished is already installed. An application program of a version concerned is newly installed upon determining that the application program of the version concerned is found to be not installed by this judgment result.

For example, this characteristic or feature point may be a reserved word and/or a syntax pattern of macro instruction in a document or data file.

In many cases, these reserved words and the syntax pattern depend on a version of the application program. For example, depending on the application program, one version of the application program may use different rules for instructing a computer (or other processing devices) to perform specific tasks in comparison to another version of the application program. Accordingly, most application programs define their own syntactical rules that control which words and/or instructions the computer understands. Thus, determining a version of the most suitable application program to open a document or a data file includes analyzing the document or data file and extracting the reserved words and/or syntax patterns. Because the extracted reserved words and/or syntax patterns depend on a version of an application program used to create the reserved words and/or syntax patterns, the reserved words and/or syntax patterns are used as an indication of a suitable application program to read the document or data file. Based upon the result of an analysis of various versions of application programs, both a document or data file and application programs of various corresponding versions are displayed at the same time on a display apparatus.

Then, users may select any one of these application programs to open this document file among various versions.

In the present invention, based on information provided by an analysis result, the document file may be displayed with the icons which differ in each version. Alternatively, when a user first selects a certain application program, only document files that can be opened by this selected application program may be displayed.

DETAILED DESCRIPTION OF THE PREFERRED EMBODIMENTS

Embodiment 1

Figure 1:
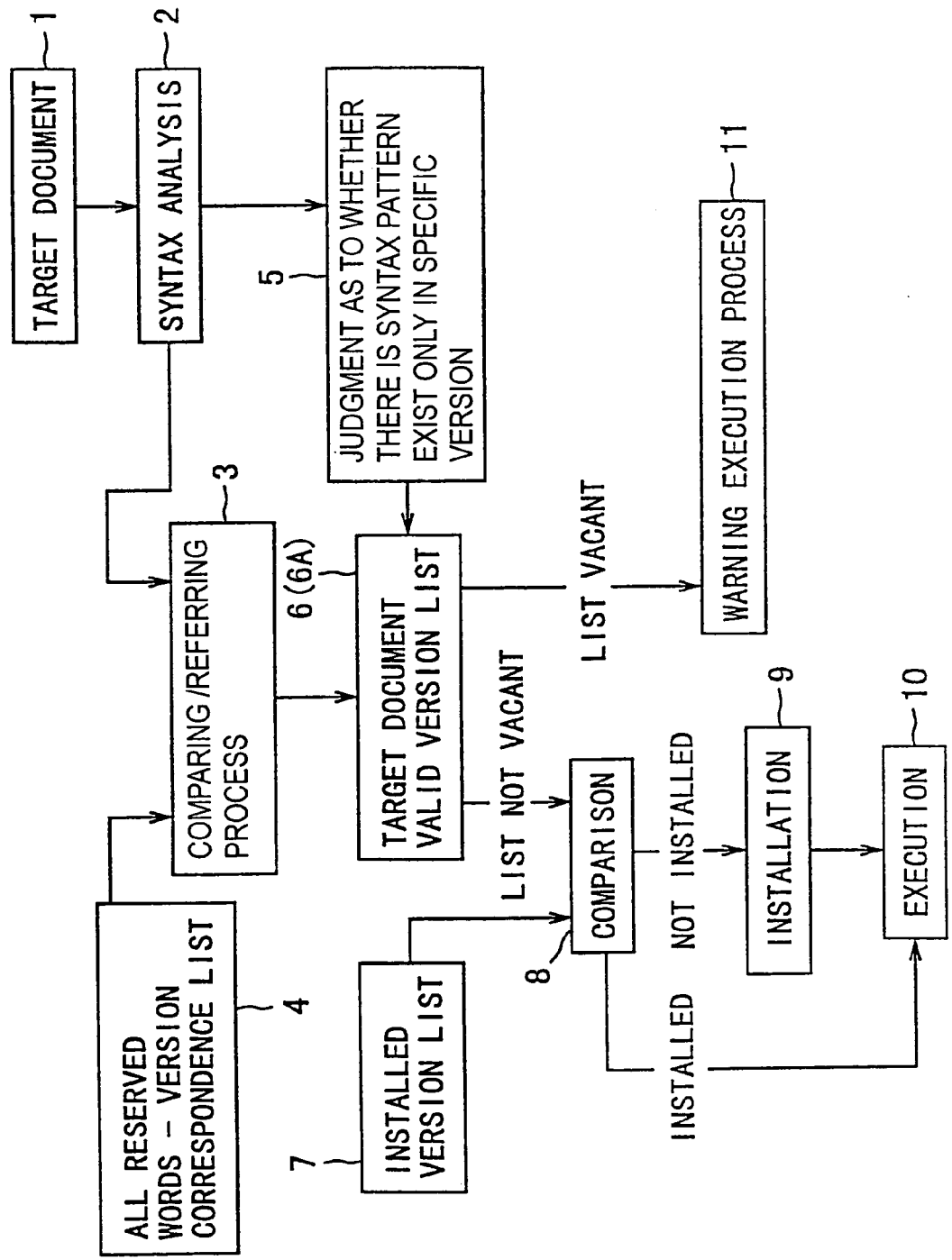
FIG. 1 is an automatic installation system according to an embodiment of this invention.
Figure 2:
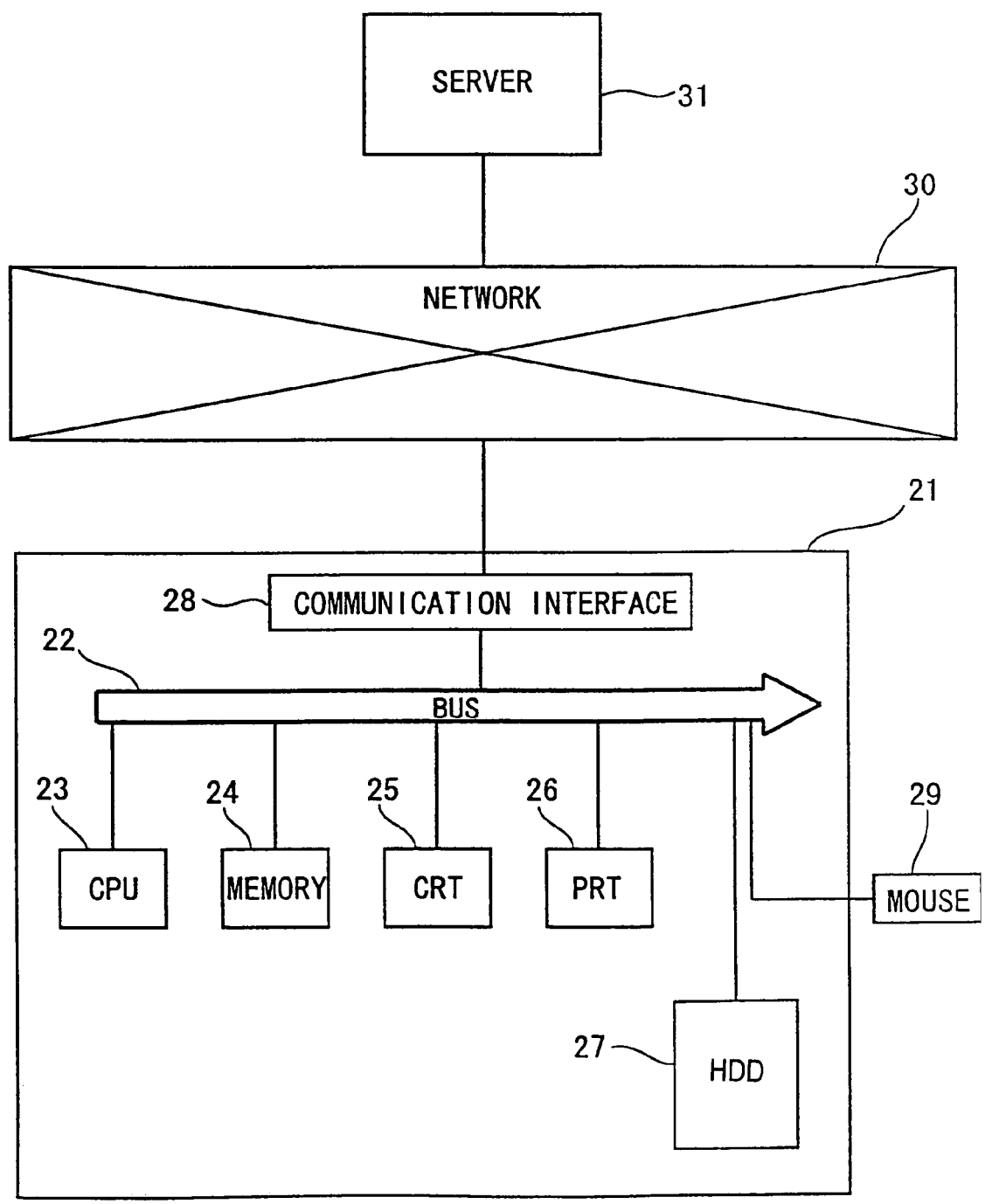
FIG. 2 is the system constitution of Embodiment 1.
Figure 3:
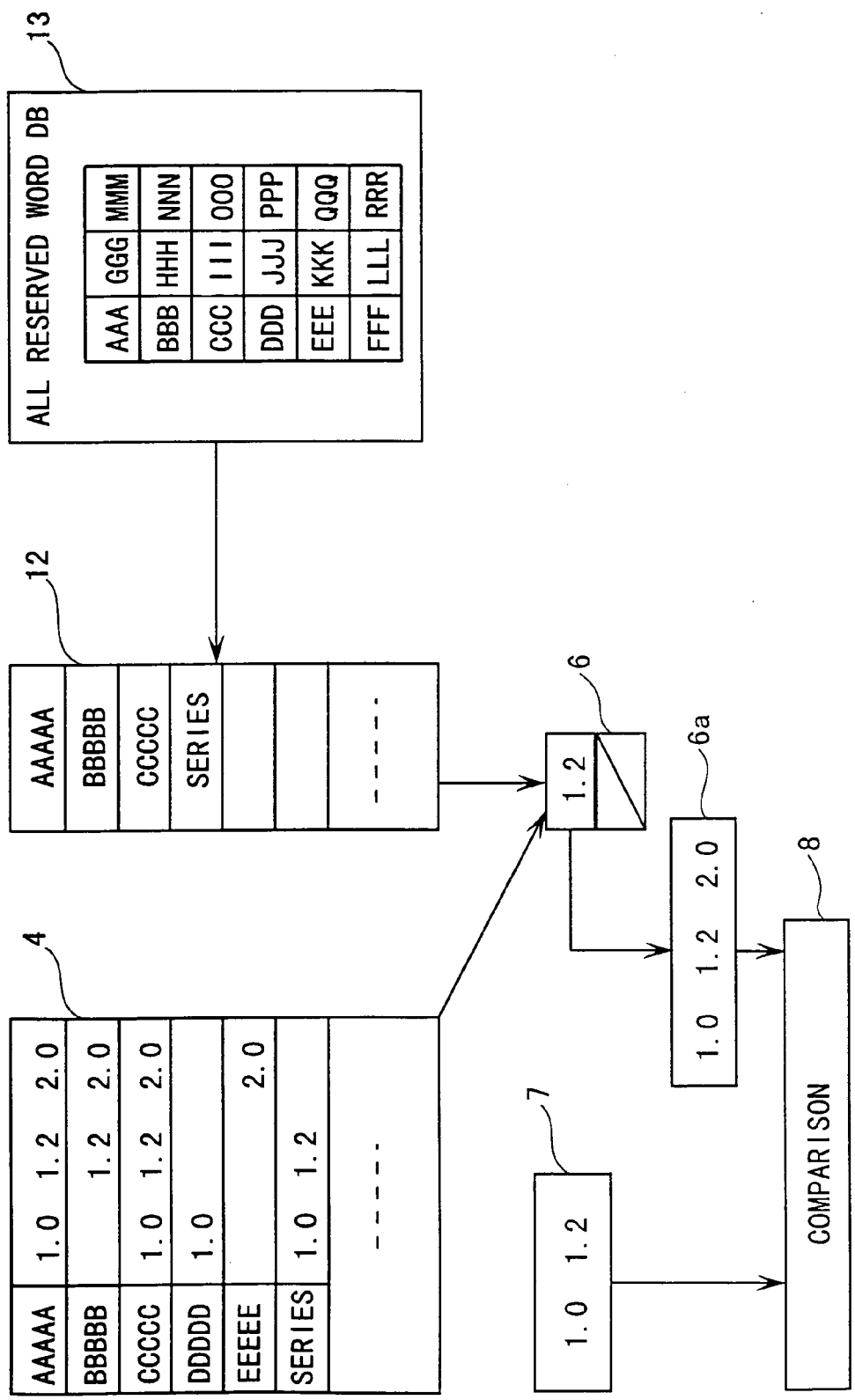
FIG. 3 is the relationship of each list of Embodiment 1.

FIG. 1 is an automatic installation system according to an embodiment of this invention, and FIG. 2 shows system constitution of this embodiment.

Terminal 21 is connected to server 31 through network 30 as shown in FIG. 2. Terminal 21 constitutes a computer system and can carry out automatic installation processing of this embodiment.

Terminal 21 has a Central Processing Unit (CPU) 23, a memory 24, a visual display unit (CRT) 25, a print unit (PRT) 26 and Hard Disk Drive (HDD) 27 through bus 22. In addition, terminal 21 has a mouse 29 as an external auxiliary input means. In addition, the bus 22 is connected to the network 30 through communication interface 28.

FIG. 1 shows an automatic installation procedure of this embodiment. A program stored in HDD 27 is read into the memory 24, and the CPU 23 executes the program sequentially. Installation is realized in such a procedure.

The target document 1, as shown in FIG. 1, is, for example, data file for a document file and a spreadsheet for a word processor. The target document 1 is registered in HDD 27. The target document 1 has a normal document domain and a macro-description domain. Processing and a correction of character string prescribed with the macro instruction that accompanied the document become possible when reading the target document 1 with a predetermined word processor program.

The CPU 23 executes syntax analysis process 2 for this target document 1 after such target document 1 is read into the memory 24. This syntax analysis process is, specifically, an operation to extract macro instruction reserved word.

Extraction of macro instruction reserved word is performed by generating the reserved word list 12 from the target document 1. This extraction is performed as follows. All the reserved words are referred to a database (DB) 13 registered with HDD 27. The reserved word from the inside of the target document 1 is extracted by pattern matching. This extracted reserved word is registered in reserved word list 12. The list 4 registered in the HDD 27 is compared with this reserved word list 12. (comparing/referring process 3). At last, a valid version list 6 for the target document 1 is generated.

In addition, CPU 23 executes search of a syntax pattern in parallel with above-mentioned syntax analysis process 2 (step 5). A macro-program in target document 1 is divided to a token, an attribute of a token is judged, and it is judged whether a combination state of a token of a specific attribute exists. The detection of a syntax pattern is realized in this way. The detection of a coupling state implies, for instance, detection of a coupling state "variable which constitutes instance of Collection-Class"+"("+"variable which constitutes instance of Strings-Class"+")".

When a valid version list 6a is generated, a detection result of the syntax pattern is indicated and a final valid version list 6a is generated. When the version list 6a is generated, either an extraction result of a macro instruction reserved word or a detection result of a syntax pattern may be given a priority. For example, when the version generated based upon the extracted result of the macro instruction reserved word is different from the version produced based upon the detection result of the syntax pattern, a latest version of an application program that has having a larger numeral value may be employed with a priority so as to produce the valid version list 6a.

Secondly, an installed version list 7 is compared with the valid version list 6a (comparison process 8). When an application program of a corresponding version is installed, in the already executable state in HDD 27, in terminal 21 as a result of this comparison process 8, the application program is executed (execution process 10). When an application program of a corresponding version is not installed, installation process 9 is performed.

It should also be noted that when the valid version list 6 (6a) is produced, if the content of the version list is empty, namely if the valid version cannot be judged, then the CPU 23 executes a warning process 11. For example, as for this warning process 11, a visual warning display may be performed on the CRT 25.

Embodiment 2

In Embodiment 1, the method for automatically determining the optimum version of the relevant application program in such a manner that the CPU 23 executes the comparing process operation 8 is described. This Embodiment 2 has the following characteristics. A result of comparison process 8 is displayed in the form that at a glance a user can grasp on the CRT 25. The user may then select an application program having more than one version.

It should be understood that since the process operations defined prior to the comparing process operation 8 are similar to those of Embodiment 1 among the process operations explained in FIG. 1, explanations thereof are omitted.

Figure 4:
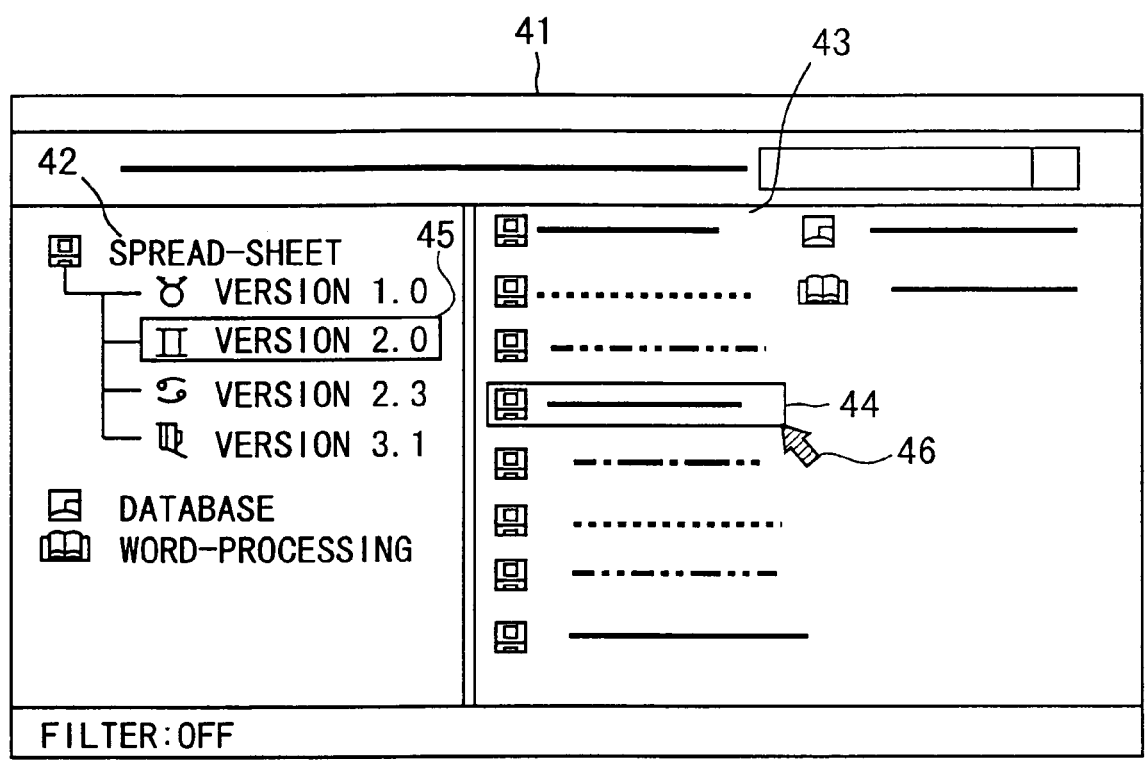
FIG. 4 is a screen display example in visual display unit of Embodiment 2.

While the CPU 23 compares the valid version list 6(6a) obtained from the target document 1 with the installed version list 7, this CPU 23 displays a comparison screen 41 as indicated in FIG. 4 on the CRT 25. This comparison screen 41 is divided in application list display window 42 of a left side of the figure, and module list display window 43. In application list display window 42, an application program can be displayed in a hierarchical manner for each group. In the figure, version 1.0-3.1 are listed as an application program in a folder of a spreadsheet (a spreadsheet program).

In addition, the database program and the word processor program are in a closed state, but have a plurality of application programs in their folders as well.

On the other hand, in module list display window 43, more than one target document 44 (FIG. 1, target document 1) is displayed as a module. A user can decide optionally which document (a module) should be opened by which version of an application program by referring to CRT.

In FIG. 4, for example, when the target document 44 (a module) is opened by an application program of version 2.0 of a spreadsheet, the mouse cursor 46 on a screen is arranged by the mouse 29, and a button of the mouse 29 (not illustrated) is pushed once here. By this act (drag), the target document 44 (a module) is selected, and only an application program of a version for opening this target document 44 is displayed with high brightness in application list display window 42. That is, a plurality of corresponding versions are displayed with high brightness when there are plurality of versions of application programs to open the target document 44.

An activation method of an application program will now be discussed. The Mouse cursor 46 is moved on an application program of an arbitrary version (this place, version 2.0) on application display window 42 in the state a button of the mouse 29 being pushed (a drag state). When the button is opened up (drop), an application program of version 2.0 of a spreadsheet is activated as a target file with the target document 44 (a module). This technique is an input technique on screen interface so-called "drag & drop."

Figure 5:
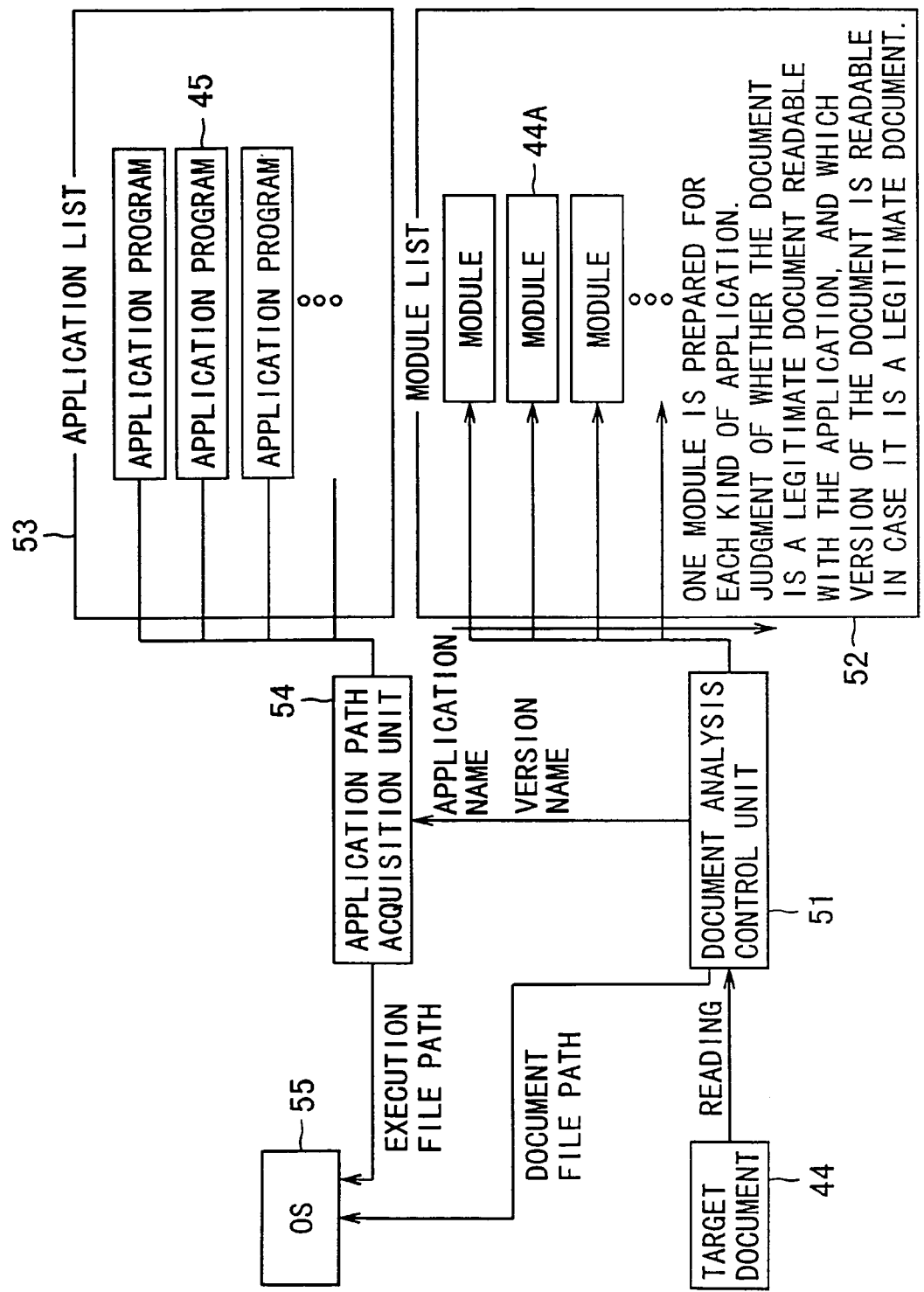
FIG. 5 is a screen constitution of FIG. 4.

FIG. 4 and FIG. 5 describe function constitution to realize interface. The document analysis control unit 51 has a function to execute the syntax analysis process 2 and the comparing/referring process 3, as shown in FIG. 1. The document analysis control unit 51, also has a function to control display on the CRT 25. That is, the document analysis control unit 51 sequentially reads the target documents 1 under a predetermined folder or a directory and executes analysis of the version and displays the target documents 1 in a list form on the module list display window 43.

In a module displayed on this module list display window 43 (target document 44), the following matters are distinguished by the document analysis control unit 51: whether the document file is a legitimate document file readable by an application program installed in HDD 27 or not, and with which version the document can be opened when the document is a legitimate document file.

When document analysis control unit 51 reads the target document 1 and executes analysis, it notifies application path acquisition unit 54 of an application name and the version name which are the result of this analysis. This application path acquisition unit 54 controls a display of application list display window 42. The application path acquisition unit 54 lets application list display window 42 display only an application of a version received from document analysis control unit 51.

When target document 44 on the module list display window 43 (a module) is selected by drag operation of mouse 29, this choice information is notified to the application path acquisition unit 54 through the document analysis control unit 51. A version of a corresponding application program on the application list display window 42 is displayed with high brightness.

When an application of a predetermined version (45 to program an application of a spreadsheet of version 2.0 here) is selected by drop operation of mouse 29, this choice information is notified to Operating System (OS) as an execution pass through the application path acquisition unit 54. The OS, thus, receives an execution file path from application path acquisition unit 54 and also receives a document file path from document analysis control unit 51. The OS executes target document 44 (a module) by an application program of a selected version.

In addition, Windows 3.1, Windows 95 or Windows 98 of Microsoft Inc. and other OS may be used as OS in this embodiment.

Figure 6:
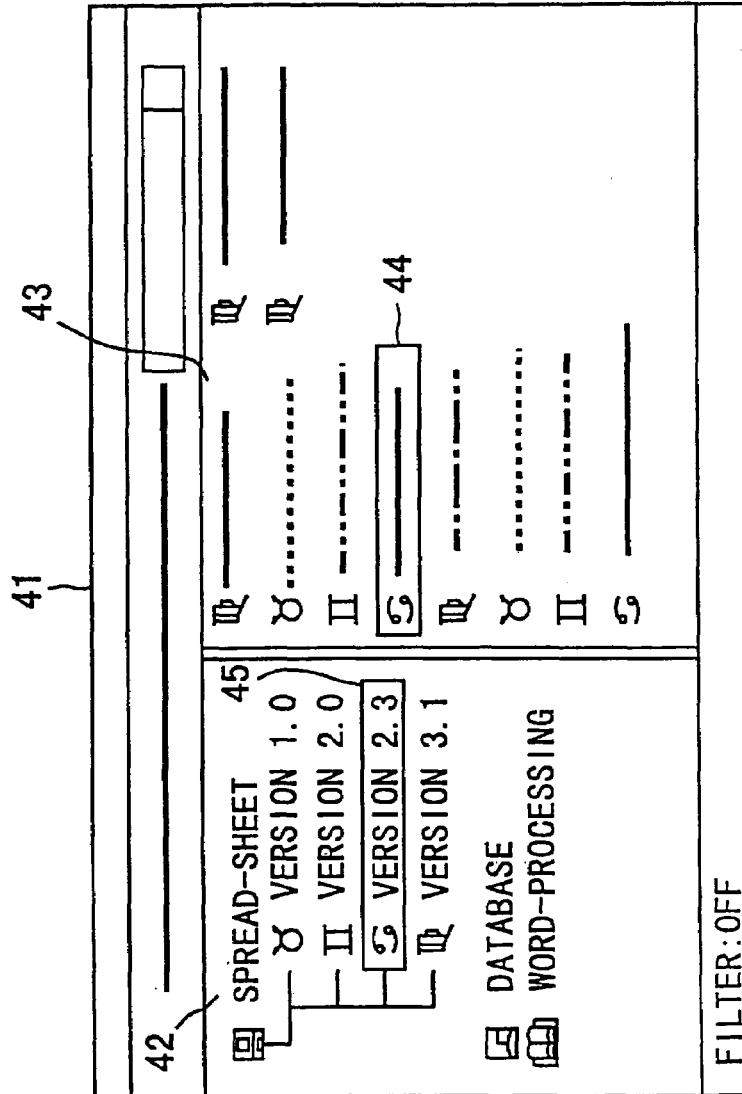
FIG. 6 is a screen display example in visual display unit of Embodiment 2.
Figure 7:
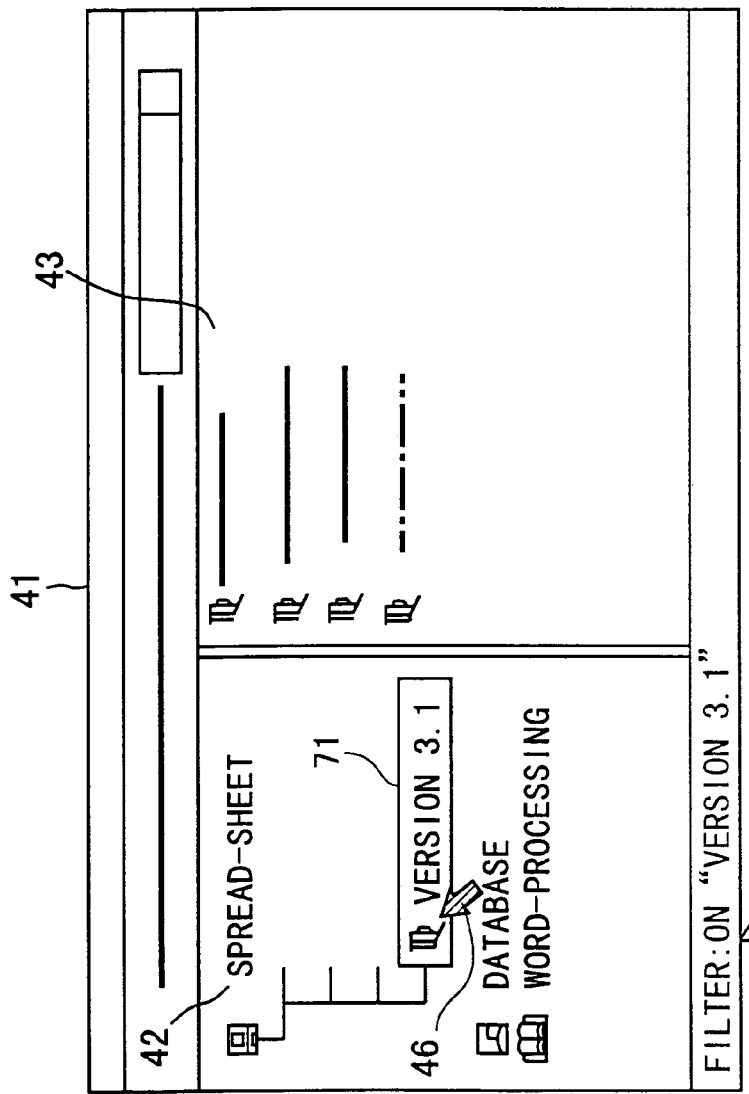
FIG. 7 is a screen display example in visual display unit of Embodiment 2.

FIG. 6 and FIG. 7 are transformation examples of the comparison display in which a version of an application program corresponding to a target document (a module) and a target document are compared in a display of comparison screen 41.

FIG. 6 is the figure with an icon of a corresponding version when a different icon is defined by each version of an application program and the target document 44 (a module) is displayed. Here, in the existing OS, an icon is defined by extension of a file name (for example, XLS and DOC).

Therefore, the file is displayed with the same icon even if a version of the file is different when the same extension is given to a file. Getting a grasp of a version of the target document used to be difficult when merely the icon was displayed.

Here, in an example shown by FIG. 6, the corresponding version is grasped by all target documents 44 in the document analysis control unit 51. Therefore, a version corresponding to a target document is displayed without being controlled by the presence of extension of a file name but being distinguished at first sight with an icon.

FIG. 7 is the example where only the target document 44 corresponding to a version appointed with the application list display window 42 is displayed in the module list display window 43. Here, when a specific version is appointed by the application list 53, the version is detected by the application path acquisition unit 54, and it is informed that the version is appointed towards the document analysis control unit 51. Based on this notice, only a target document corresponding to the version (module 44) is displayed on the module list display window 43 by the document analysis control unit 51.

Figure 8:
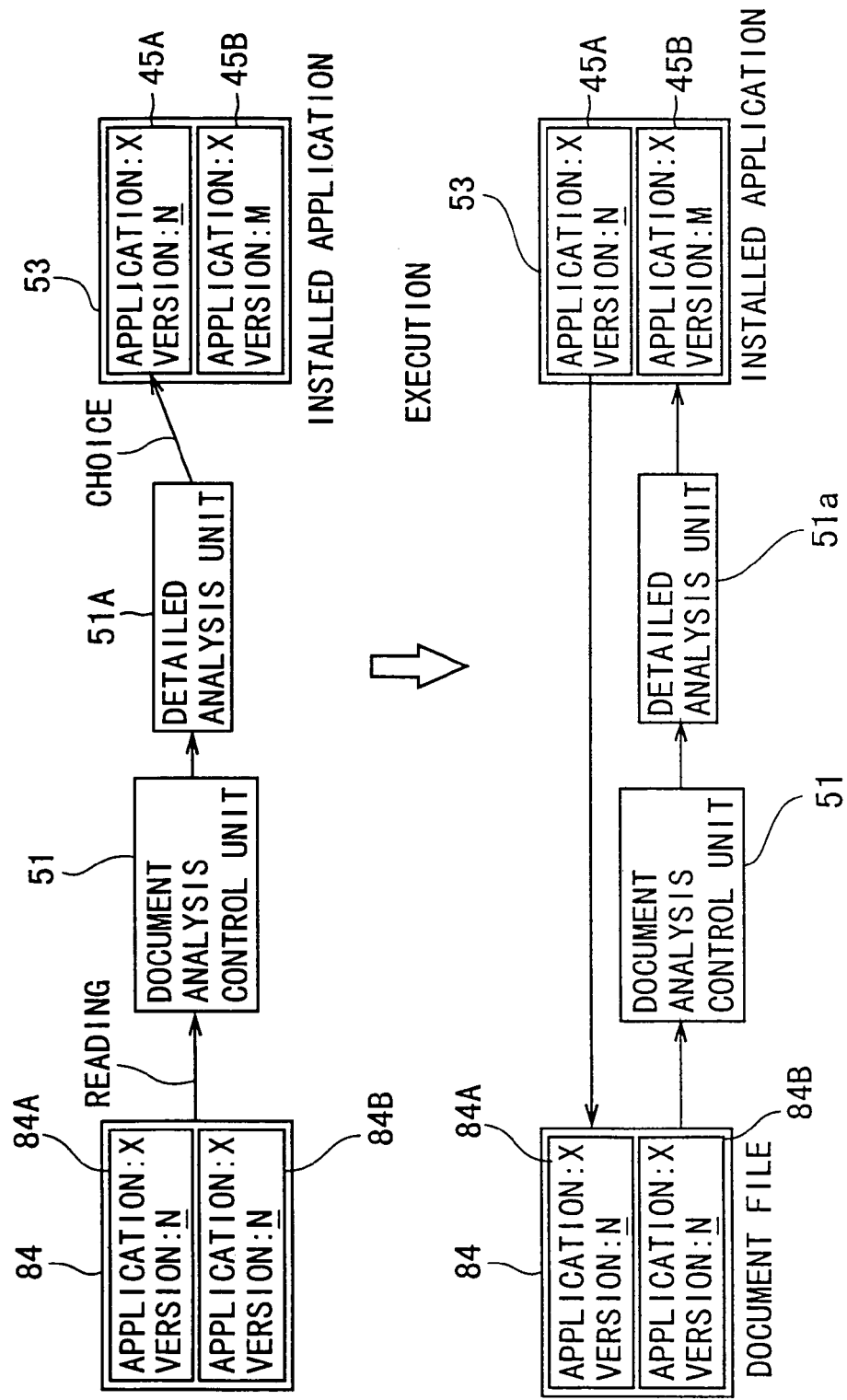
FIG. 8 is a document file's relationship with an application program in Embodiment 2.

FIG. 8 shows a version of the application program 53 being selected by a target document. The screen interface described in FIG. 4, FIG. 6, and FIG. 7, aids the target document 84a and 84b to be read in the document analysis control unit 51, as described below. When these target documents are analyzed by the detailed analysis unit 51a, the application program 45a of the most suitable version is chosen among already installed application programs (FIG. 8). The target document 84a is opened by the application program 45a decided by the detailed analysis unit 51a.

Figure 9:
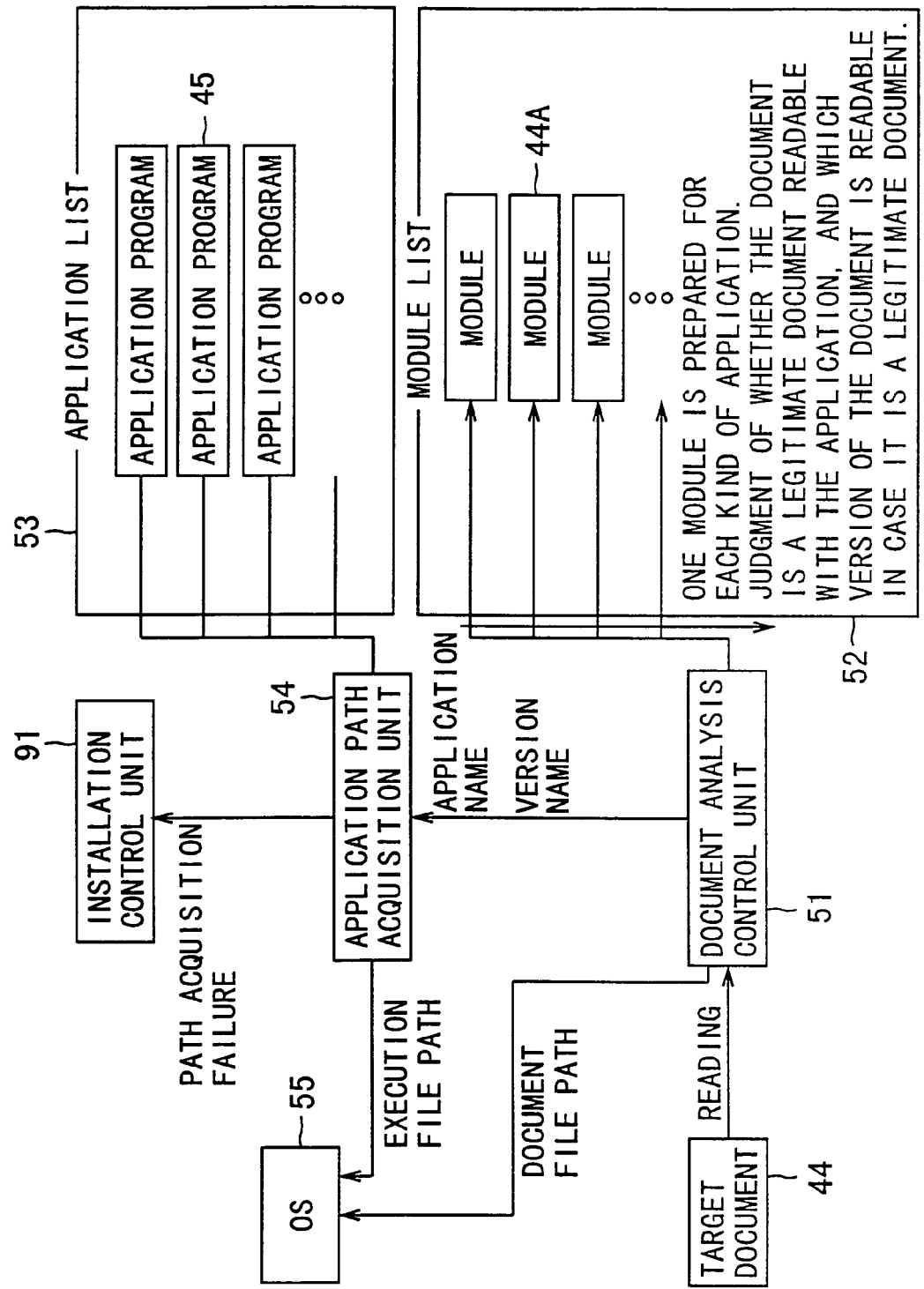
FIG. 9 is a figure showing when an application program of a corresponding version does not exist in an application list as a result of analysis according to a document analysis control unit in Embodiment 2.

In function constitution, an application program of a version corresponding target document 44 does not exist in application list 53, shown in FIG. 9, that target document 44 is analyzed by document analysis control unit 51. Since, most of the function constitution shown in FIG. 9 is similar to FIG. 5, a detailed explanation is omitted.

The installation control unit 91, shown in FIG. 9, is the control unit for installing an application program in the state that execution is possible in HDD 27. Specifically, the installation control unit 91 has a function to install an application program in HDD 27 of the terminal 21 from a CD-ROM and server 31 that are not illustrated. When the application path acquisition unit 54 cannot acquire a path from the application list 53, in other words, when a version corresponding to the target document 44 selected in module list 52 (a module) does not exist, the method in which the installation control unit 91 is activated is shown in FIG. 9.

Figure 10:
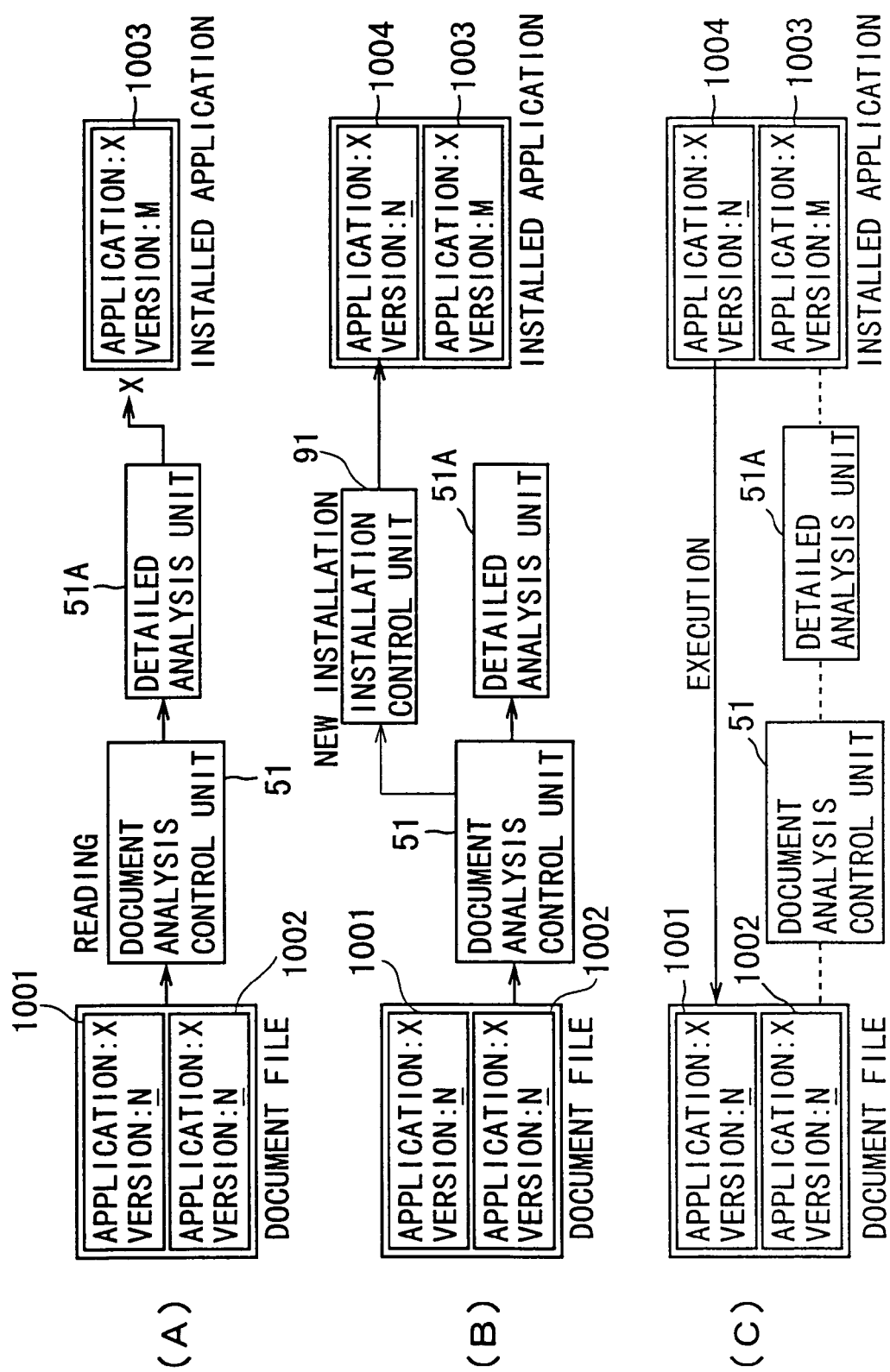
FIG. 10 is a method of installing an application program based on a document analysis result in Embodiment 2.

FIG. 10 is an installation procedure of an application program of a new version by the installation control unit 91 is shown. In the figure, the target document 1001, 1002 of version n are read into the document analysis control unit 51 sequentially, and the detailed analysis unit 51a judges a version of an application program.

In spite of the judgment, an already installed application program (1003) is version m. It does not correspond to the target documents 1001 and 1002 of the version n (FIG.

10(a)). A notice from the document analysis control unit 51 is received then, the installation control unit 91 is activated, and the application program 1004 corresponding to the version n of the target documents 1001, 1002 is newly installed (FIG. 10(b)).

Here, an installation source of the application program may be HDD 27 in the terminal 21, it may be the CD-ROM drive unit which is not illustrated, and from server 31 through network 30. When an application program is downloaded through network 30 by server 31, FTP (File Transfer Protocol) using TCP/IP may be used.

The application program 1004 newly installed in HDD 27 is activated, and the target document 1001 or the target document 1002 of a version corresponding to this application program 104 (FIG. 10(c)) is opened.

Figure 11:
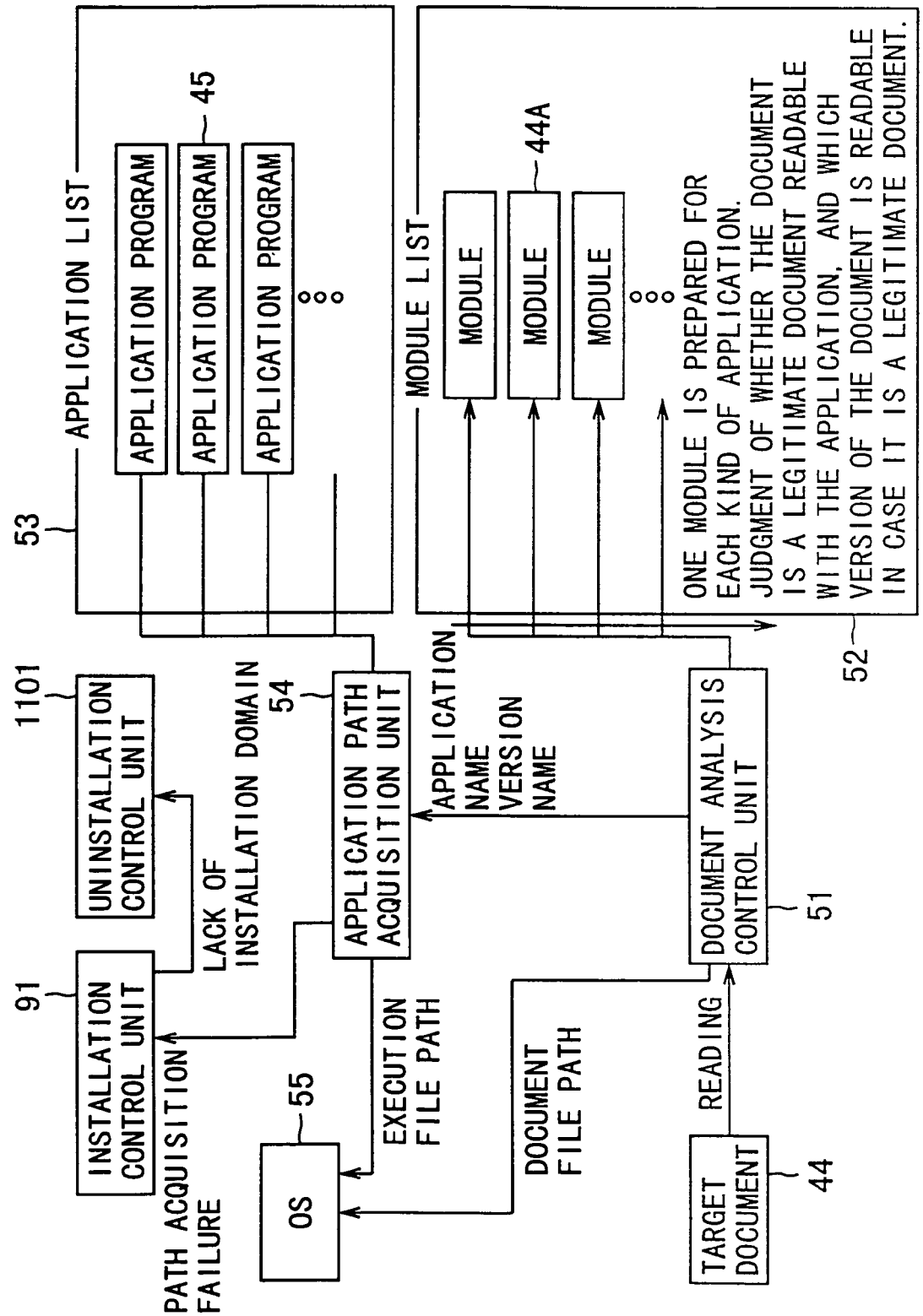
FIG. 11 is a method of uninstalling when an installation domain is insufficient in Embodiment 2.
Figure 12:
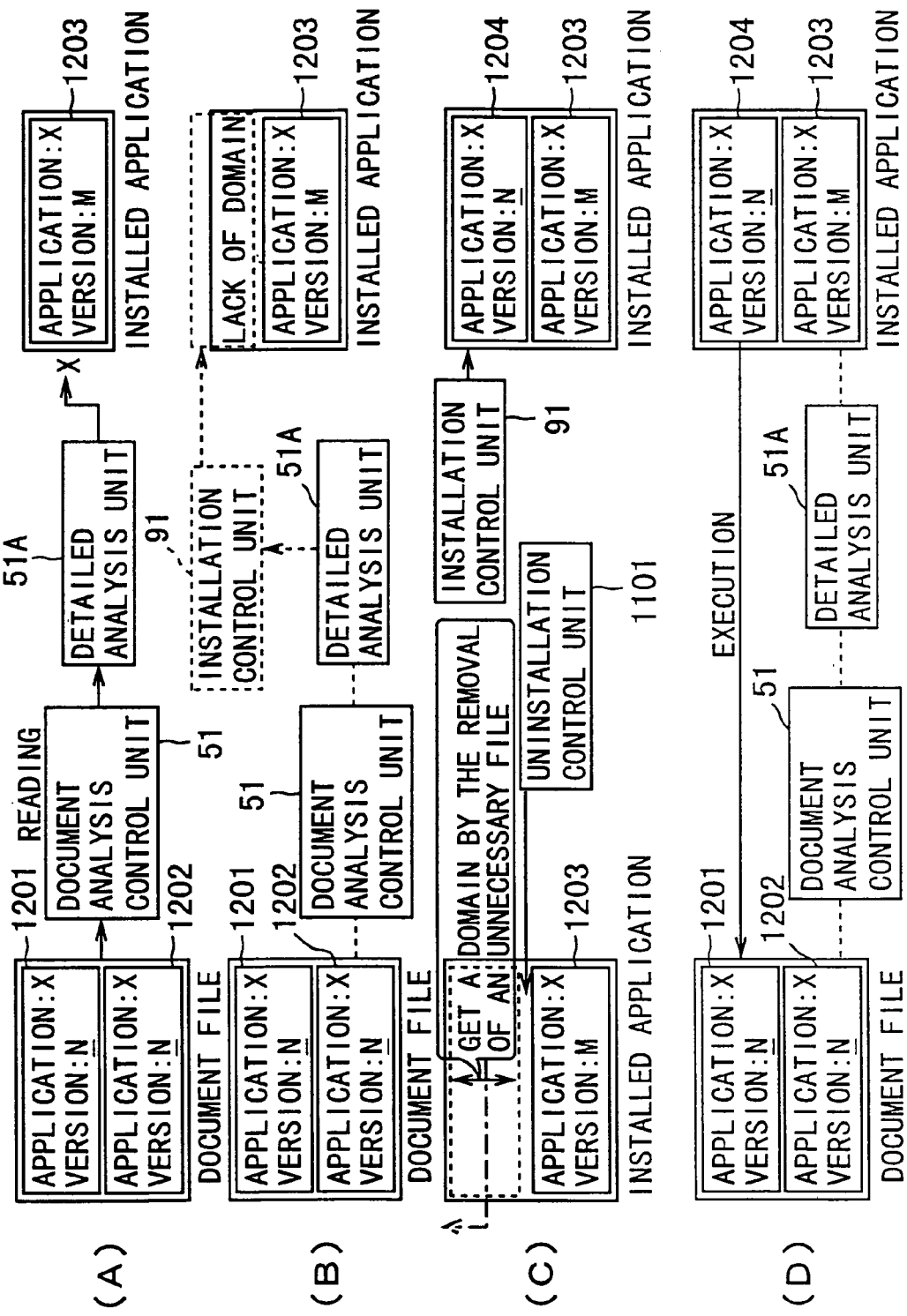
FIG. 12 is a procedure to execute uninstallation and get a domain in Embodiment 2.

When an application program of a necessary version is installed, the procedure for an installation domain to be kept are shown in FIG. 11 and FIG. 12.

In FIG. 11, the uninstallation control unit 1101 is added to the function constitution shown in FIG. 9. That is, even though the installation control unit 91 is activated by an example described in FIG. 9 and FIG. 10, there is the case that the domain where an application program of a new version is installed in HDD 27 is insufficient, in this case, the uninstallation control unit 1101 shown in FIG. 11 is activated. This uninstallation control unit 1101 is also realized as a program, and the uninstallation control unit 1101 is realized by the program being executed by the CPU 23.

FIG. 12 shows a procedure of the uninstallation and installation. When the most suitable version is not detected by an application program installed by the detailed analysis unit 51a (FIG. 12(a)), the installation control unit 91 starts. However, there is the case that the domain where a new application program is installed, does not remain in HDD 27 (FIG. 12(b)). In this case the installation control unit 91 notifies the uninstallation control unit 1101 of domain insufficiency. By this, the uninstallation control unit 1101 eliminates an unnecessary file from HDD 27. It is decided which file is eliminated with a standard as follows.

For example, the application program that does not satisfy a utilization condition may be uninstalled with precedence. For example, an application program of a condition that it is usable after its download for 30 days corresponds to this. In addition, it can be uninstalled in volume order.

Generally, when importance of an application with a little volume is low, the volume is eliminated first from a small application program. In addition, the volume is eliminated from a big application program when uninstalled program number is reduced and when the domain keeping efficiency is given priority.

In addition, a decision to uninstall may be decided by an installed date order, an importance, a number of a made document and number of a common file.

Figure 13:
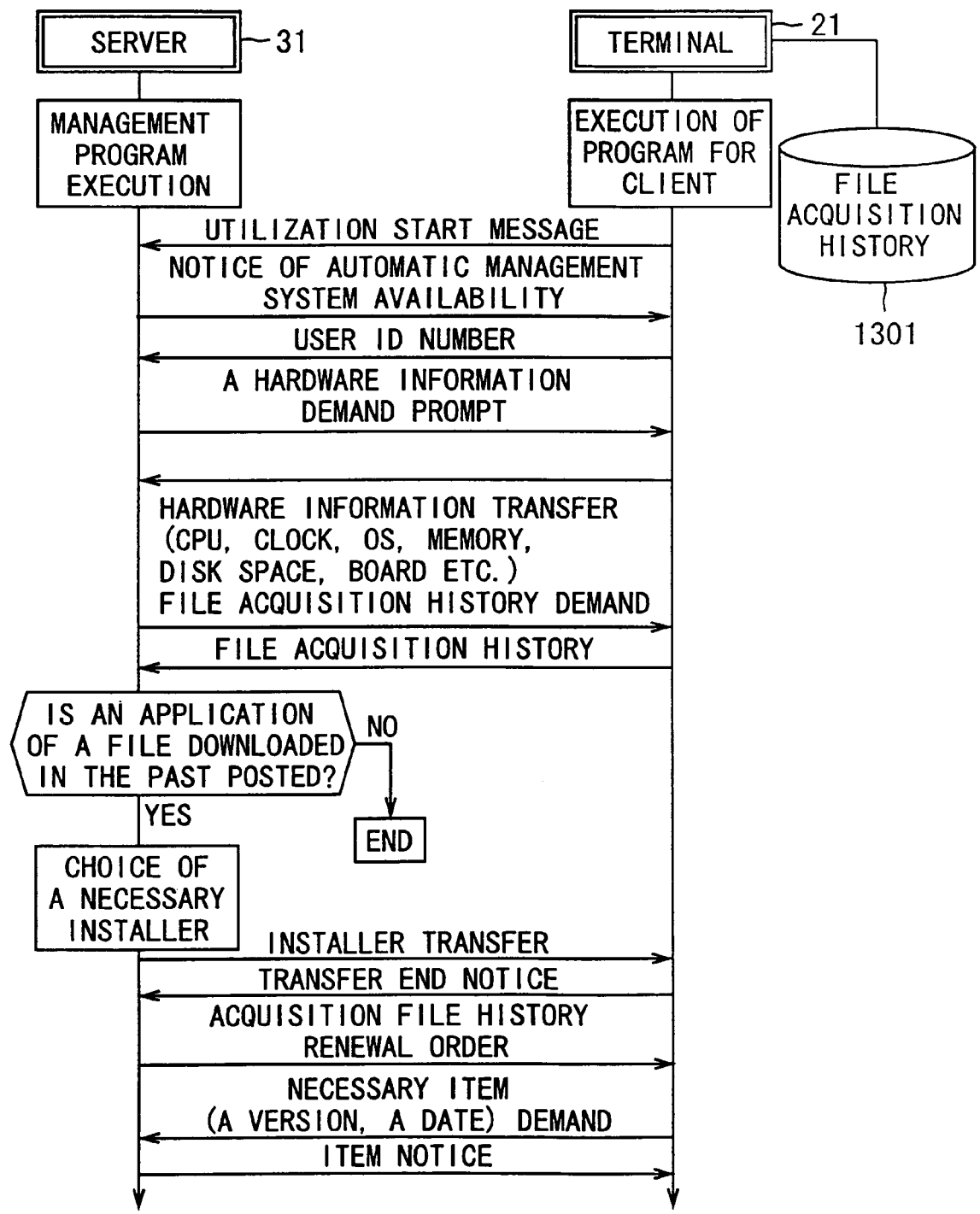
FIG. 13 is a sequence of steps showing the method of downloading an application program through a network in Embodiment 2.
Figure 14:
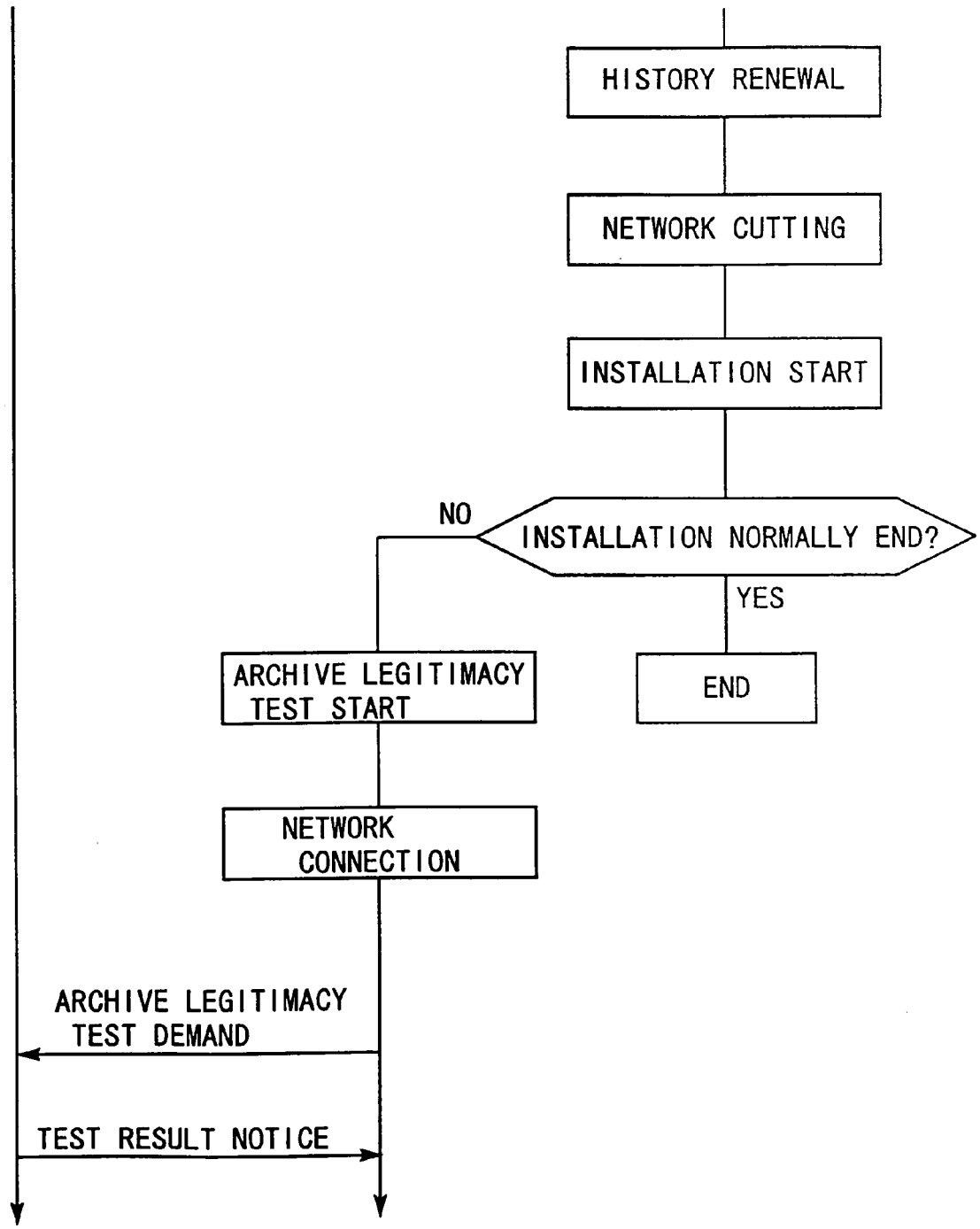
FIG. 14 is a sequence of steps showing the method of downloading an application program through a network is Embodiment 2.

FIG. 13 and FIG. 14 are figures of sequence wherein the procedure of an application program being downloaded through the network 30 from the server 31 to the terminal 21, is shown.

FIG. 13, the server 31 activates a management program, and terminal 21 activates a program for client. In addition, in HDD 27 of terminal 21, a history of a file acquired from server 31 by terminal 21 is stored as a file acquisition history file 1301.

At first, an installation process is started by installation control unit 91 of terminal 21, and a utilization start message is transmitted to the server 31 from the terminal 21. By this, the server 31 recognizes installation start, and the effectiveness of an own automatic management system is notified to terminal 21.

Secondly, the terminal 21 notifies server 31 of a user identification mark (ID). When the server 31 receives this ID, the server 31 demands hardware information from terminal 21.

This hardware information is classification of CPU 23 of terminal 21, clock frequency (Clock), the OS, memory capacity, and the volume of HDD 27. The server 31 demands a file acquisition history for terminal 21 after having received this information. This file acquisition history is so-called "history". This includes information such as a file name, URL (Uniform Resource Locator), compression system, a version, and the terminal 21 has this information as the file acquisition history file 1301 in HDD 27.

When the server 31 receives this file acquisition history, the following matters are judged based on this history. Whether the history was downloaded to the server in the past, and whether a new version of a file is already stored in a downloadable state in the server. When a new version does not exist, the process finishes after an application program of a latest version is viewed from the server 31, is installed in the terminal 21.

On the other hand, when an application of a newer version exists in the server 31 than an application in a file acquisition history provided from the terminal 21, a necessary installer (an auxiliary program to execute installation) is selected, this is forwarded to terminal 21.

After the transfer of the installers from terminal 21 to server 31 is finished, the server 31 orders terminal 21 to renew a file acquisition history. Based on this order, terminal 21 demands a necessary item such as a version and file date from server 31. The server 31 replies to this and notifies the terminal 21 of information of the item.

Based on the item information, the terminal 21 renews own file acquisition history file 1301 and cuts off a network connected to the server 31 and terminal 21 activates a downloaded installer and starts installation. In this case, a legitimacy test of an archive begins when the installation is not finished normally. This archive legitimacy test is performed in the following process. Network connection with server 31 is performed again. A demand of test is transmitted to server 31. Based on this test result, when necessary, the installer is forwarded to the terminal 21 again by server 31.

According to the present invention, an application program of the most suitable version can be decided for the data file, which is not specified from the appearance of a file, and the application program is installed automatically, thus automatic activation of the application becomes possible.

What is claimed is:

1. An installation method of an application program, comprising:

extracting a reserved word of a macro instruction in a data file automatically after having analyzed the data file based on a stored reserved word, the reserved word extracted being a content within the data file;

selecting a version from an installed version list for the extracted reserved word automatically, wherein the reserved word is an application program that is to be installed;

determining whether the selected version of the application program is already installed;

installing the selected version of the application program automatically upon determining that the version of the application program is not installed; and executing the selected version of the application program automatically by executing the macro instruction.

2. The installation method mentioned in claim 1, wherein:
the selecting of the version of the application program suited for the data file is decided by the extracted reserved word and the installed version list of the application program.

3. The installation method mentioned in claim 1, wherein:
a syntax pattern of the macro instruction included in the data file is extracted, and
the version of the application program suited for the data file is decided by the syntax pattern and the version of the application program enabled to read the syntax pattern is determined by comparing the syntax pattern with stored syntax patterns.

4. The installation method mentioned in claim 3, further comprising:
eliminating an existing file if insufficient space exists when the application program is executed.

5. A method of activating an application program, comprising:
extracting at least one of a plurality of reserved words of macro instructions in a data file automatically after having analyzed the data file based on stored reserved words, the reserved words extracted being contents within the data file;
selecting a version from an installed version list for the extracted reserved words automatically, the reserved words being an application program to be installed;
displaying simultaneously the data file and the selected version of the application program; and
activating the selected version of the application program automatically by executing the macro instructions.

6. The activation method mentioned in claim 5, wherein:
the data file is displayed with a format corresponding to the application program.

7. The activation method mentioned in claim 5, wherein:
only the data file corresponding to a version of the application program is displayed when the application program is selected.

8. The activation method mentioned in claim 5, wherein:
the installation of a corresponding application program is executed when an application program corresponding to the data file does not exist.

9. A computer storage medium on which an application program is recorded, the application program when executed by the computer, causes the computer to execute the functions comprising:
extracting at least one of a plurality of reserved words of macro instructions in a data file automatically after having analyzed the data file based on stored reserved words, the reserved words extracted being contents within the data file;
selecting a version from an installed version list for the extracted reserved words automatically, the reserved words being an application program to be installed;
displaying simultaneously the data file and the selected version of the application program; and
activating and installing the selected version of the application program automatically by executing the macro instructions.

10. An apparatus for activating an application program, comprising:
a memory storing reserved words;
an extracting unit extracting at least one of a plurality of reserved words of macro instructions in a data file automatically after having analyzed the data file based on the stored reserved words, the reserved words extracted being contents within the data file;
a selecting unit selecting a version from an installed version list for the extracted reserved words automatically, the reserved words being an application program that is to be installed;
a displaying unit simultaneously displaying the data file and the selected version of the application program; and
an activating unit activating the selected version of the application program automatically by executing the macro instructions.

11. An apparatus for installing an application program, comprising:
a memory storing reserved words;
an extracting unit extracting at least one of a plurality of reserved words of macro instructions in a data file automatically after having analyzed the data file based on the stored reserved words, the reserved words being a content within the data file;
a selecting unit selecting a version from an installed version list for the extracted reserved words automatically, the reserved words being an application program that is to be installed;
a judging unit judging whether the application program of the selected version is already installed; and
an installation unit installing the selected version of the application program automatically when the selected version of the application program is not installed; and
executing the selected version of the application program automatically by executing the macro instructions.

* * * * *